United States Patent [19]

Williams

[11] Patent Number: 4,955,156

[45] Date of Patent: Sep. 11, 1990

[54] PLANT WATERING AND ROOT PROTECTION DEVICE

[76] Inventor: James P. Williams, One Laurel Ave., Belvedere, Calif. 94920

[21] Appl. No.: 318,667

[22] Filed: Mar. 3, 1989

[51] Int. Cl.$^5$ ............................................. A01G 17/00
[52] U.S. Cl. ............................................. 47/25; 47/32
[58] Field of Search .................. 47/23, 24, 25, 32, 33, 47/66

[56] References Cited

U.S. PATENT DOCUMENTS

| 109,098 | 11/1970 | Adams . | |
|---|---|---|---|
| 223,093 | 12/1879 | Barnhill | 47/23 |
| 2,170,589 | 8/1939 | Erickson | 47/23 X |
| 2,784,528 | 3/1957 | Rudenauer | 47/24 X |
| 2,940,219 | 6/1960 | Schiller . | |
| 3,005,287 | 10/1961 | Dudley . | |
| 4,019,279 | 4/1977 | Moorman | 47/25 |
| 4,106,235 | 8/1978 | Smith | 47/66 X |
| 4,647,491 | 3/1987 | Ireland et al. . | |

FOREIGN PATENT DOCUMENTS 2920873 11/1980 Fed. Rep. of Germany .......... 47/25

Primary Examiner—David A. Scherbel
Assistant Examiner—Jerrold D. Johnson
Attorney, Agent, or Firm—Flehr, Hohbach, Test, Albritton & Herbert

[57] ABSTRACT

A plant watering and protecting device is provided which protects a plant from underground attack by rodents, forms a berm for containing overhead water within the drip line of the plant, and optionally provides receptacles for underground fertilizer sticks and aboveground insecticide against surface crawling insects.

7 Claims, 2 Drawing Sheets

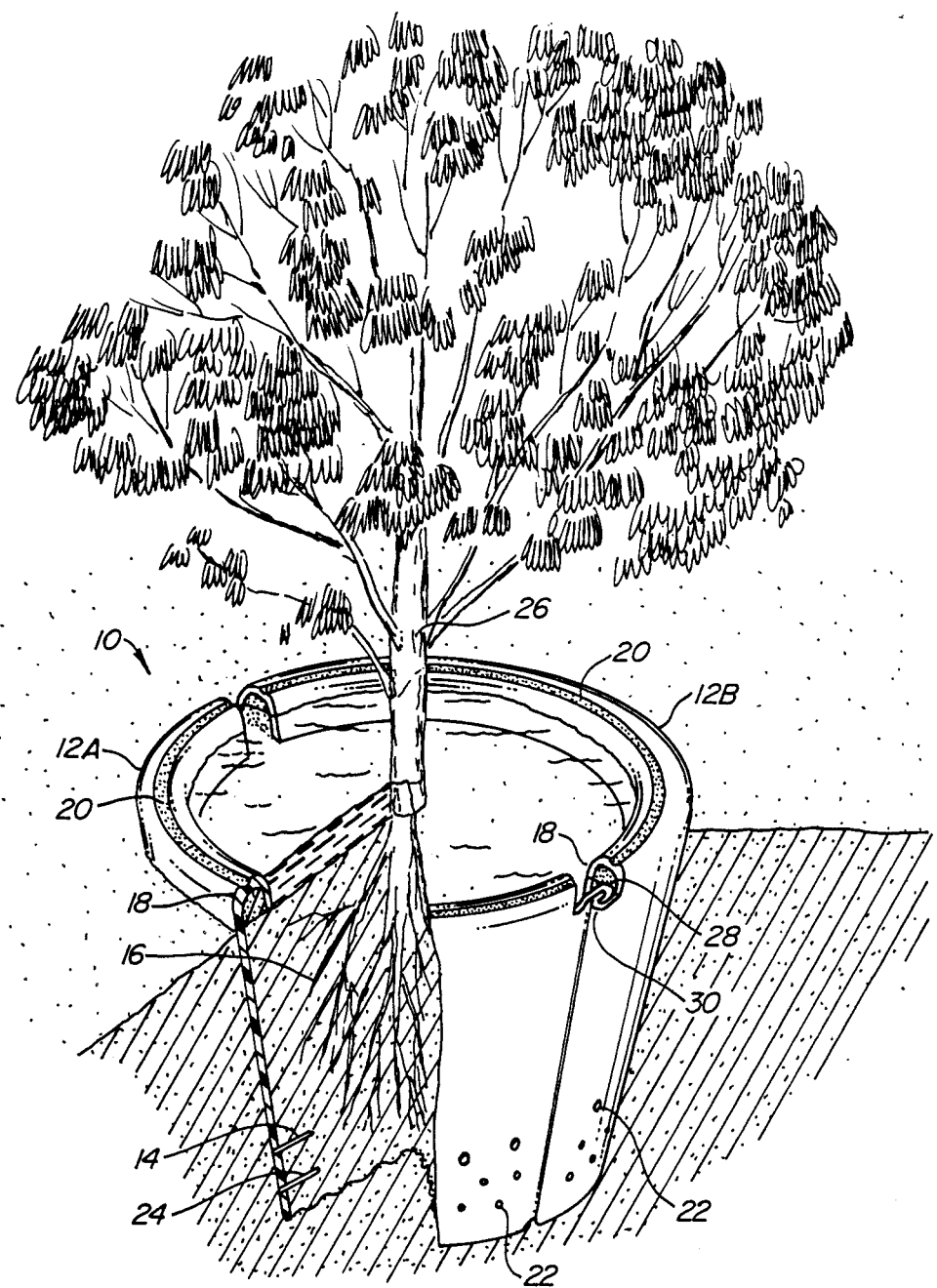
FIG._1.

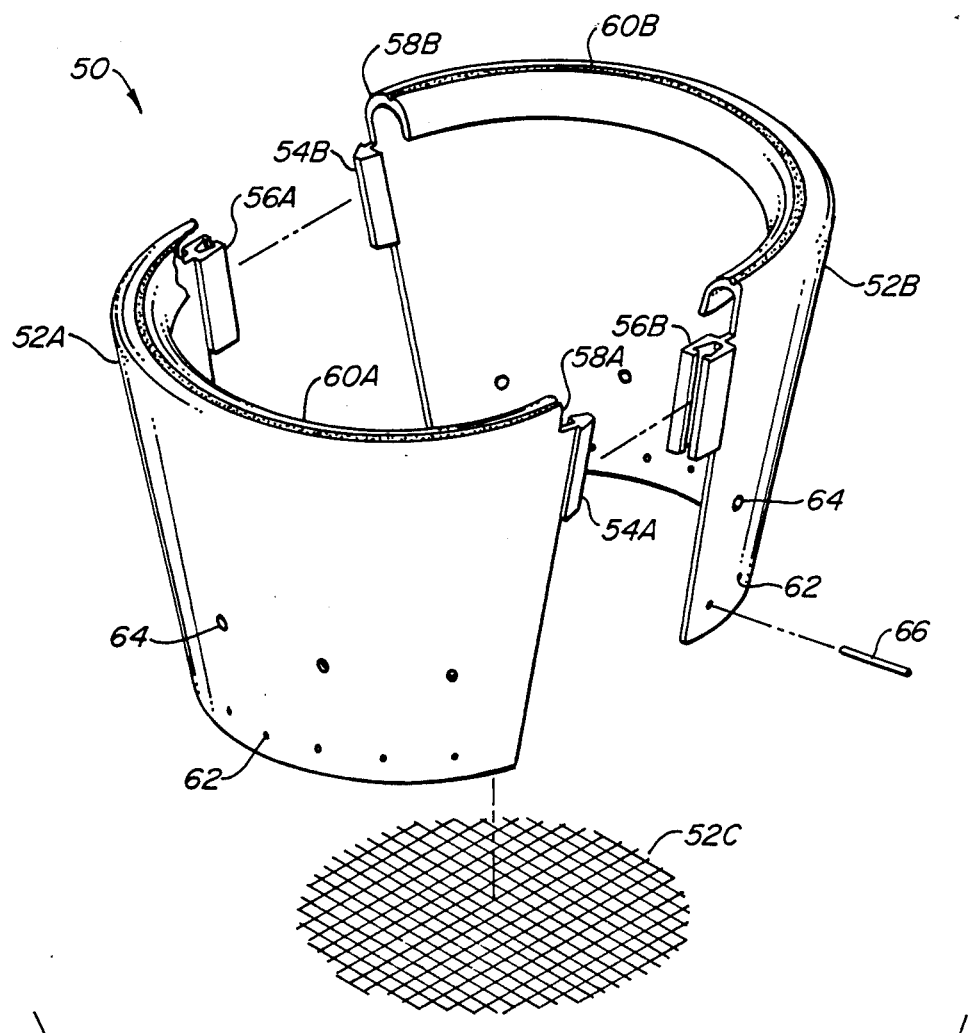
FIG._2.
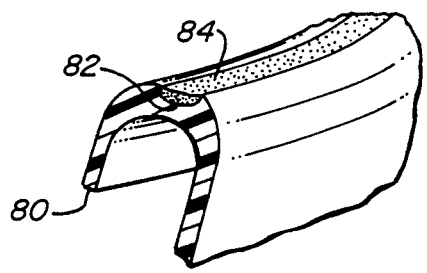
FIG._3.

PLANT WATERING AND ROOT PROTECTION DEVICE

BACKGROUND

The present invention relates to a garden and landscaping product which solves several common problems encountered in the care of plants. Furthermore, the present invention is directed to a garden and landscaping product which may be inexpensively produced, and easily stored.

When home gardeners or landscapers place a plant in the ground, unless there is a history of prior problems with the location and type of plant, a hole is typically dug into the ground and the plant is placed therein with the backfill being used to form a berm around the drip line of the plant so that overhead water is retained in a pool around the base of the plant where it can trickle to the root system. Often it is not until after the plant has been well established in the ground that certain problems arise. It is then inconvenient and expensive to uproot the plant to transfer to a different site or to install underground devices which may address the problems.

One of the problems which may arise subsequent to the establishment of a plant is attack of the root system, or of the insects which inhabit the root system, by underground rodents such as gophers and moles. Since these rodents, particularly moles, usually only travel laterally a few inches underground, it is often a sufficient protection of the plant to insert a barrier extending to a depth below which the moles typically travel.

Another problem which typically arises is that the dirt berm erodes and overhead watering becomes less effective since water drains away from the site above the root system of the plant.

Another problem which frequently arises is the attack of the plants by slugs and snails. This problem is typically addressed by surrounding the plant with an area of slug and snail bait which, when coming in contact with the slug or snails, poisons them.

An ongoing problem with many plants is the requirement for periodic fertilization which can be done with chemical fertilizers in the form of powders, pellets or sticks which can be driven into the ground. The fertilizer sticks are advantageous because they cannot be washed away by rain and because of their density and concentration the fertilizing effect is more long-lasting than a powder or pellet.

Finally, even in acute cases of attack by underground rodents such as gophers, there is usually no alternative other than to replant the plants in raised beds with an underground protection from the gophers at the bottom of the beds, thus requiring substantial visual alteration of the landscaping, not to mention the time and expense of modifying the landscaping. To the average homeowner, minimal time and expense dedicated to such landscaping modifications or maintenance, thus any effective remedy must be relatively simple to install and relatively inexpensive.

It is thus desirable to provide a means for addressing all of the above problems in a manner which is both simple to use and which requires materials which are relatively inexpensive.

It is therefore an object of the present invention to provide a plant watering and protecting device which can be readily installed to an established in-ground plant or installed initially when the plant is placed in the ground.

It is another object of the present invention to provide a method for installing a plant watering and protection device which can be easily installed, eliminating arduous and time-consuming trenching, implanting, fitting and compacting.

It is a further object of the invention to provide a plant watering and protecting device which can be easily shipped and stored and which can be stacked in a space-saving manner before use.

It is a further object of the present invention to provide a plant watering and protecting device which is durable, rustproof, non-corrosive, weather-resistant and environmentally acceptable and reusable, if so desired.

These and other objects of the invention will be apparent from the following description or from the use of the invention to those of ordinary skill in the art.

SUMMARY OF THE INVENTION

The above desirable features of a plant watering and protection device are provided in accordance with the present invention which, briefly stated, in a preferred form, comprises an assembly, intended for use underground to surround a plant except for a curvilinear lip which extends above the ground and surrounds the plant to form a water-retaining berm. The assembly is adapted for protecting roots from underground rodents and for containing overhead water in a circumferential area above the roots, comprising a plurality of interlocking pieces adapted to removably interlock with one another to form a continuous annular sheath for underground encircling of a plant root system. Each of the pieces comprises a vertically-elongated sheet of stiff, durable, rustproof, non-corrosive and weather-resistant material, the upper edge of which comprises a curled lip wherein the degree of curling of the lip is sufficient to form an upper curvilinear edge to the piece. The curvilinear edge will extend above the ground to form a berm surrounding the base of the plant in order to confine standing water within the confines of the berm. The two vertical edges of each piece will be of sufficient length to extend to an underground depth beneath the entire, or the major portion of, the root system of the plant. Each of the vertical edges is adapted with interlocking engaging means for engaging and interlocking with a corresponding interlocking engaging means on the vertical edge of another piece. The curvilinear edge may be adapted with a groove for containing an insecticide. If used when the plant is initially inserted into the ground, a screen may be used as part of the assembly whereby the screen is securely attached to the lower proximal edges of the pieces to completely enclose and protect the plant from the sides and bottom from the attack of rodents. The pieces may also be perforated to enhance draining of water from the root system. The pieces may also be adapted with means for attaching solid chemical sticks. Preferably each piece comprising the sheath, upper curvilinear edge (with or without the groove) and the interlocking engaging means are made in a single molded form.

BRIEF DESCRIPTION OF THE DRAWINGS

Fig. 1 is a cutaway pictorial view of a plant watering and protecting device according to the invention.

FIG. 2 is an exploded view of another embodiment of the plant watering and protection device according to the invention.

FIG. 3 is a cutaway detail view of the upper edge of the device shown in FIG. 2.

DETAILED DESCRIPTION OF THE PREFERRED EMBODIMENTS

A plant watering and protection device according to a first embodiment of this invention is shown in FIG. 1. The device is generally designated by reference numeral 10, which comprises two interlocking pieces 12A and 12B, which are identical. When interlocked as shown, the pieces 12A and 12B form a substantially continuous annular sheath 14 surrounding the plant root system 16. For purposes of illustration, a portion of piece 12A is shown in a partial cutaway view to show the relationship between the root system 16 and the outer sheath 14. The upper edge of piece 12A (and 12B) comprises a curvilinear lip 18 which extends above ground. Along the top of the lip 18 is a groove 20 which may be used to contain an insecticide.

As shown, the bottom of the device 10 is open-ended and therefore water draining from within the confines of the area circumscribed by lip 18 may drain through the root system. To assist in the drainage there may be perforations 22 in the sheath 14 of sufficient size to allow passage of water therethrough, but not large enough to admit small rodents. Some of the perforations 22 may be made of a size to accommodate commercial fertilizer sticks 24 which may be inserted and buried when the plant is initially inserted into the ground.

The maximum circumference of the device 10 is preferably as large as the maximum expected or desired circumference defined by the drip line of the plant 26. The conventional definition of a drip line of a plant is the perimeter defined by the vertical protection onto the ground of the outermost branches on the plant. Thus, it will be appreciated that the device 10 may be made in several convenient sizes to accommodate the size of common landscaping or gardening plants. The device 10 may be utilized either when the plant is first buried in the ground or may be inserted at a later date into the soil after the plant has been established once one or more of the problems discussed have been identified. Since the device will be made of a stiff material, such as ¼ inch thickness plastic it may simply be inserted into the soil using the leading (lower) edge of the sheath 14 and driving the sheath 14 into the soil in any convenient manner, leaving the lip 18 above the soil. The second interlocking member (12B) may then be similarly inserted and simultaneously interlocked with the first inserted piece 12A. Once inserted the lip 18 forms a berm surrounding the base of the plant 26 above ground to collect overhead water and retain it within the drip line of the plant. In most instances the drip line of the plant also defines the outer underground extent of the root system 16, therefore the berm allows for efficient watering of the plant where it most needs the water, directly above its root system. Furthermore the sheath 14 forms an annular protector around the root system to repel rodents which normally traverse the ground within a few inches from the surface. Furthermore the groove 20 can serve as a receptacle for insecticides for surface insects such as snails and slugs. As the snails or slugs attempt to traverse the lip 18 they will contact the insecticide in the receptacle 20 and be poisoned.

Referring to FIG. 2 there is shown a second embodiment of the present invention designated generally by reference numeral 50. The assembly 50 will comprise as shown two essentially identical pieces 52A and 52B and a lower screening piece 52C. Device 50 is similar to device 10 shown in FIG. 1 with the following differences.

Referring to FIG. 1 the method of interlocking pieces 12A and 12B is by way of an outwardly curving lip 28 on one vertical edge of piece 12A and a corresponding interlocking inwardly curved lip 30 on a vertical edge of piece 12B. At the interlocking seam on the opposite side of the device 10 (not shown in FIG. 1) the outwardly curled lip will be on piece 12B and the inwardly curled lip will be on piece 12A.

Returning to FIG. 2 the interlocking means comprises, on one vertical edge of pieces 52A and 52B a male tab 54A and 54B, respectively, and corresponding female receptacle 56B and 56A, respectively, adapted to receive the tabs. It will be appreciated that numerous ways for securely but removably engaging in interlocking pieces 52A and 52B at their vertical edges may be employed and the present invention is not intended to be limited by the securing devices shown in FIGS. 1 and 2.

Similar to device 10 shown in FIG. 1, device 50 is characterized by upper curvilinear lip 58A and 58B which will extend above the ground and by the grooves 60A and 60B which may serve as receptacles for insecticide.

An additional piece 52C is a screen or grating made of durable plastic or corrosion-resistant metal which can be securely attached to device 50 proximal to the lower edges of the pieces 52A and 52B. This may be done, for example, by insertion of projecting ends of the screen or grating 52C into perforations 62 made to be of sufficient size to accommodate the gauge size of the splines or wires comprising the screen or grating 52C. The pieces 52A and 52B also have perforations 64 to assist in drainage from the root system to the exterior of the device 50. Unused perforations 62 and one or more of perforations 64, or additional perforations (not shown) of different diameters, may also be used to accommodate conventional fertilizer sticks 66 in a manner shown and described in connection with FIG. 1. Device 50 may be utilized when a plant is first inserted into the ground since screen or grating 52C must be inserted before the plant is buried. Device 52 is particularly useful in situations where deep burrowing rodents such as gophers are prevalent which might otherwise burrow below the protective shields of pieces 52A and 52B to attack the root system from directly below. The gauge of the members comprising the grading or screen 52C must be of sufficient size and durability to withstand attack from rodents such as gophers and the spacings in the mesh of the screen or grating must of course be of sufficient size to repel small rodents.

Referring to FIG. 3 there is shown a detail of the upper curvilinear lip 58 (in FIG. 2) or 18 (FIG. 1). The degree of the curl in the lip is sufficient to form a curvilinear edge. Conveniently and preferably, the degree of the curl should be about 180° as shown, i.e., the curl turns back upon itself so that the leading edge 80 can form an edge for halting the insertion of the pieces (52 or 12) into the ground when inserting them. The groove 82 is shown as containing a powdered chemical insecticide 84. The depth of the groove 82 is sufficient to form a small trough, but not sufficiently deep to jeopardize the strength of the curvilinear edge defining the lip.

It is preferred that the devices 10 and 50 are formed of individual pieces each of which can be individually molded without attaching or affixing parts by gluing, brackets, screws, clips, etc. Thus as shown the pieces 12 and 52 can be molded in a single mold without the necessity of attaching interlocking devices, thus making the devices easily and economically manufactured. The grating 52 shown in FIG. 2 may similarly be cut from available screening or molded as a plastic grating in a single piece.

While the above description constitutes the preferred embodiments of the present invention, it will be appreciated that the invention is susceptible to modification, variation and change without departing from the scope and spirit of the appended claims.

What is claimed is:

1. A plant watering and protecting assembly adapted for protecting roots from underground rodents and for containing overhead water in a circumferential area above said roots for drainage into said roots, comprising a plurality of interlocking pieces adapted to removably interlock with one another to form a continuous annular sheath for underground encircling of said plant root system; each of said pieces accommodating securing means to which a solid chemical stick can be secured wherein each of said pieces is a single-molded form comprising a vertically-elongated sheet of stiff material, the upper edge of said piece comprising a curled lip wherein the degree of curling of said lip is sufficient to form an upper curvilinear edge to said piece and said curvilinear edge is adapted with a continuous groove extending along the entire length of said curvilinear edge, said curvilinear edge forming a berm for surrounding the base of a plant above ground in order to confine standing water within confines of said berm; the two vertical edges of said piece being of sufficient length to extend to an underground depth beneath the entire, or a major portion of, said root system; each of said vertical edges being adapted with interlocking engaging means for engaging and interlocking with a corresponding interlocking engaging means on a vertical edge of another of said pieces.

2. An assembly according to claim 1 further comprising screening means adapted to securely engage to said assembly proximal to the lower edge of said assembly to enclose the lower opening of said assembly, said screening means characterized by openings of sufficient size to allow passage of water therethrough and to prevent passage therethrough of a rodent.

3. An assembly according to claim 2 wherein said screening means is attached to said assembly through perforations in each of said pieces, said perforations being located proximal to the lower edge of each of said pieces.

4. An assembly according to claim 1 wherein each of said pieces is perforated, said perforations being of sufficient size to allow passage of water therethrough and to prevent passage therethrough of a rodent.

5. An assembly according to claim 1 wherein said securing means comprises an orifice in said sheath of dimensions sufficient to securely accommodate said stick.

6. An assembly according to claim 1 wherein said interlocking engaging means comprises a male tab on a vertical edge of one of said pieces, and a corresponding female receptacle on a vertical edge of another of said pieces, said tab and receptacle being adapted to securely interlock together to hold said edges essentially contiguous with each other.

7. An assembly according to claim 1 wherein said interlocking engaging means comprises an outwardly curled lip on one vertical edge of one of said pieces and an inwardly curled lip on a vertical edge of another of said pieces, said outwardly curled lip and inwardly curled lip adapted to securely interlock together to securely hold said pieces essentially contiguous with each other.

* * * * *